US012669167B2

(12) United States Patent
    Isono

(10) Patent No.:   US 12,669,167 B2
(45) Date of Patent:     Jun. 30, 2026

(54) MOTION CONVERSION DEVICE AND POWER GENERATION DEVICE INCLUDING THE SAME

(71) Applicant: AISIN CORPORATION, Kariya (JP)

(72) Inventor: Hiroshi Isono, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/973,530

(22) Filed: Dec. 9, 2024

(65) Prior Publication Data

US 2025/0198492 A1     Jun. 19, 2025

(30) Foreign Application Priority Data

Dec. 18, 2023   (JP) ................................. 2023-212881

(51) Int. Cl.
    *F16H 37/12*     (2006.01)
    *F02B 63/04*     (2006.01)
    *F16H 57/08*     (2006.01)
    *H02K 7/075*     (2006.01)
    *H02K 7/18*     (2006.01)
    *F16H 55/17*     (2006.01)

(52) U.S. Cl.
    CPC ........... *F16H 37/12* (2013.01); *F02B 63/042* (2013.01); *F16H 57/08* (2013.01); *H02K 7/075* (2013.01); *H02K 7/1815* (2013.01); *F16H 2055/176* (2013.01)

(58) Field of Classification Search
    CPC .......... F16H 37/12; F16H 57/08; F16H 21/18; F16H 21/34; F02B 63/042; H02K 7/075; H02K 7/1815
    See application file for complete search history.

(56) References Cited

U.S. PATENT DOCUMENTS 2,715,685 A  *  8/1955  Brown ..................... H02K 7/14
                                      310/83

FOREIGN PATENT DOCUMENTS

EP       0 708 274 A1    4/1996
FR        2034244 A1  * 12/1970  ........... F16H 21/365
JP        9-119301 A   5/1997

* cited by examiner

*Primary Examiner* — Derek D Knight
(74) *Attorney, Agent, or Firm* — Sughrue Mion, PLLC

(57) ABSTRACT

Provided is a motion conversion device that can properly support a load acting axially on a planetary gear unevenly. A radius of a ring gear being a stationary internal gear is twice a radius of the planetary gear that rotates integrally with a crank member. A first planetary bearing and a second planetary bearing that support the planetary gear relative to a carrier are respectively disposed on one side and another side of an axial direction with respect to a planetary gear tooth section. A first carrier bearing and a second carrier bearing that support the carrier relative to the ring gear are respectively disposed on one side and another side of the axial direction with respect to a ring gear tooth section so as to respectively overlap, when viewed along a radial direction, movement trajectories of the first and second planetary bearings being generated when the planetary gear revolves.

11 Claims, 5 Drawing Sheets

MOTION CONVERSION DEVICE AND POWER GENERATION DEVICE INCLUDING THE SAME

CROSS REFERENCE TO RELATED APPLICATIONS

This application is based on and claims priority under 35 U.S.C. § 119 to Japanese Patent Application 2023-212881, filed on Dec. 18, 2023, the entire content of which is incorporated herein by reference.

TECHNICAL FIELD

This disclosure generally relates to a motion conversion device that converts reciprocating motion into rotational motion and a power generation device including the motion conversion device.

BACKGROUND DISCUSSION

JPH09-119301A discloses a motion conversion device (1) that converts reciprocating motion of an input member (24) into rotational motion of an output member (10) by a planetary gear mechanism (4). The planetary gear mechanism (4) includes a ring gear (20) being a stationary internal gear, a planetary gear (21) that meshes with the ring gear, and a carrier that rotatably supports the planetary gear. In the description above, reference signs indicated in parentheses derive from those in JPH09-119301A.

In the motion conversion device (1) of JPH09-119301A, the input member (24) is disposed in such a way as to protrude to one side in an axial direction (to the left in FIG. 3 of JPH09-119301A) from the planetary gear (21). The carrier includes a shaft section (12) that rotatably supports the planetary gear (21) from inside in a radial direction and a connecting section (11) that is disposed on another side in the axial direction (to the right in FIG. 3 of JPH09-119301A) with respect to the planetary gear (21) and connects the shaft section (12) to the output member (10).

In such a configuration, it is difficult to ensure support stiffness of the planetary gear (21), and thus, when a load being input from the input member (24) acts on the planetary gear (21) unevenly in the axial direction, the load cannot be properly supported.

Therefore, it is desired to achieve a technique in which, even when a load acts on the planetary gear unevenly in the axial direction, the load can be properly supported.

A need thus exists for a motion conversion device, which is not susceptible to the drawback mentioned above.

SUMMARY

In view of the aforementioned problem, a motion conversion device according to this disclosure includes:

a planetary gear mechanism including a ring gear being a stationary internal gear, a planetary gear that meshes with the ring gear, and a carrier that rotatably supports the planetary gear;

a crank member that is disposed in such a way as to extend in a planetary gear radial direction orthogonal to a planetary gear axis serving as a rotation axis of the planetary gear and coupled to the planetary gear in such a way as to rotate in an integrated manner;

an input member that is supported by the crank member and disposed on an input axis spaced apart from the planetary gear axis in the planetary gear radial direction; and an output member being coupled to a specific rotatable member that rotates in conjunction with the carrier, the specific rotatable member being a member other than the planetary gear, wherein a radius of the ring gear is twice as large as that of the planetary gear, assuming that a direction along a carrier axis serving as a rotation axis of the carrier is an axial direction and a direction orthogonal to the carrier axis is a radial direction, a first planetary bearing and a second planetary bearing that support the planetary gear rotatably with respect to the carrier are respectively disposed on one side and another side of the axial direction with respect to a tooth section of the planetary gear, a first carrier bearing and a second carrier bearing that support the carrier rotatably with respect to the ring gear are respectively disposed on one side and another side of the axial direction with respect to a tooth section of the ring gear, the first carrier bearing is disposed in such a way as to overlap, when viewed along the radial direction, a movement trajectory of the first planetary bearing being generated when the planetary gear revolves, and the second carrier bearing is disposed in such a way as to overlap, when viewed along the radial direction, a movement trajectory of the second planetary bearing being generated when the planetary gear revolves.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

1. First Embodiment

Figure 1:
FIG. 1 is a cross-sectional view of a motion conversion device according to a first embodiment.
Figure 1:

A motion conversion device 10 according to a first embodiment is described below with reference to FIG. 1. As illustrated in FIG. 1, the motion conversion device 10 includes a planetary gear mechanism 1, a crank member 2, an input member 3, and an output member 4.

The planetary gear mechanism 1 includes a ring gear RG, a planetary gear PG, and a carrier CR. The ring gear RG is an internal gear that is fixed in such a way as not to rotate. The planetary gear PG meshes with the ring gear RG. The carrier CR rotatably supports the planetary gear PG.

A radius $r1$ of the ring gear RG is twice as large as a radius $r2$ of the planetary gear PG. In this application, a "radius of a gear" means a radius of a pitch circle of the gear.

In the following description, a direction along a carrier axis X1 serving as a rotation axis of the carrier CR is defined as an "axial direction L". One side of the axial direction L is defined as a "first side L1 of the axial direction" and the other side of the axial direction L is defined as a "second side L2 of the axial direction". A direction orthogonal to the carrier axis X1 is defined as a "radial direction R". A direction orthogonal to a planetary gear axis X2 serving as a rotation axis of the planetary gear PG is defined as a "planetary gear radial direction Rp".

The planetary gear mechanism 1 includes a first planetary bearing B11 and a second planetary bearing B12, and a first carrier bearing B21 and a second carrier bearing B22.

The first planetary bearing B11 and the second planetary bearing B12 are bearings for supporting the planetary gear PG rotatably with respect to the carrier CR. The first planetary bearing B11 and the second planetary bearing B12 are respectively disposed on one side and the other side of the axial direction L with respect to a planetary gear tooth section PGa, which is a tooth section of the planetary gear PG. In an example illustrated in FIG. 1, as the first planetary bearing B11 and the second planetary bearing B12, bearings that are relatively thin (that is, a dimension in the planetary gear radial direction Rp is small) are used, such as needle roller bearings or plain bearings.

The first carrier bearing B21 and the second carrier bearing B22 are bearings for supporting the carrier CR rotatably with respect to the ring gear RG. The first carrier bearing B21 and the second carrier bearing B22 are respectively disposed on one side and the other side of the axial direction L with respect to a ring gear tooth section RGa, which is a tooth section of the ring gear RG. In the example illustrated in FIG. 1, as the first carrier bearing B21 and the second carrier bearing B22, ball bearings are used.

The first carrier bearing B21 is disposed in such a way as to overlap, when viewed along the radial direction R, a movement trajectory of the first planetary bearing B11 generated when the planetary gear PG revolves. The second carrier bearing B22 is disposed in such a way as to overlap, when viewed along the radial direction R, a movement trajectory of the second planetary bearing B12 generated when the planetary gear PG revolves. Two elements being arranged in such a way as to "overlap when viewed along a specific direction" means that when an imaginary straight line that is in parallel with a viewing direction is shifted in directions orthogonal to the imaginary straight line, there is a region in which the shifted imaginary straight line at least partially intersects both of the two elements.

In this embodiment, the planetary gear PG is provided with a shaft section 11 that extends along the axial direction L. The shaft section 11 is coupled to the planetary gear tooth section PGa in such a way as to rotate in an integrated manner. The shaft section 11 is disposed in such a way as to extend to both sides in the axial direction L with respect to the planetary gear tooth section PGa. A part of the shaft section 11 extending from the planetary gear tooth section PGa to the first side L1 of the axial direction is supported by the first planetary bearing B11 rotatably with respect to the carrier CR. A part of the shaft section 11 extending from the planetary gear tooth section PGa to the second side L2 of the axial direction is supported by the second planetary bearing B12 rotatably with respect to the carrier CR. In the example illustrated in FIG. 1, the planetary gear PG in its entirety including the planetary gear tooth section PGa and the shaft section 11 is integrally constructed.

In this embodiment, the ring gear RG is provided with a first supporting section 12 and a second supporting section 13, which respectively extend to one side and the other side of the axial direction L with respect to the ring gear tooth section RGa. The first supporting section 12 supports the first carrier bearing B21 from outside in the radial direction R. The second supporting section 13 supports the second carrier bearing B22 from outside in the radial direction R. Each of the first supporting section 12 and the second supporting section 13 is cylindrically shaped with respect to the carrier axis X1 serving as an axis.

In this embodiment, the first supporting section 12 is disposed in such a way as to overlap, when viewed along the radial direction R, the movement trajectory of the first planetary bearing B11 generated when the planetary gear PG revolves. The second supporting section 13 is disposed in such a way as to overlap, when viewed along the radial direction R, the movement trajectory of the second planetary bearing B12 generated when the planetary gear PG revolves.

As illustrated in FIG. 1, the crank member 2 is disposed in such a way as to extend in the planetary gear radial direction Rp. The crank member 2 extends across the planetary gear axis X2 and an input axis X3 spaced apart from the planetary gear axis X2 in the planetary gear radial direction Rp. The crank member 2 is coupled to the planetary gear PG in such a way as to rotate in an integrated manner. In this embodiment, the crank member 2 is coupled to a part of the shaft section 11 of the planetary gear PG that is located on the first side L1 of the axial direction with respect to the first planetary bearing B11 in such a way as not to be relatively rotatable.

The input member 3 is disposed along the input axis X3. The input member 3 is supported by the crank member 2. In this embodiment, the input member 3 is a shaft that is disposed in such a way as to protrude from the crank member 2 to the first side L1 of the axial direction. The input member 3 is coupled to the crank member 2 in such a way as to rotate in an integrated manner.

The output member 4 is coupled to a specific rotatable member RT. The specific rotatable member RT is a rotatable member other than the planetary gear PG that rotates in conjunction with the carrier CR. In this embodiment, the specific rotatable member RT is the carrier CR. Note that "to rotate in conjunction with" includes rotating at the same speed and rotating at a predetermined transmission gear ratio irrespective of a direction of rotation.

In this embodiment, the output member 4 is a shaft that is disposed along the carrier axis X1. In this embodiment, the output member 4 is disposed in such a way as to protrude from the carrier CR to the second side L2 of the axial direction. The output member 4 is coupled to the carrier CR in such a way as to rotate in an integrated manner.

In the motion conversion device 10 that is configured as described above, when predetermined driving force is input to the input member 3, the input member 3 performs reciprocating motion with respect to the carrier axis X1. Accordingly, the output member 4 rotates about the carrier axis X1.

In this embodiment, the radius r2 of the planetary gear PG is equal in size to a distance d between the planetary gear axis X2 and the input axis X3 in the planetary gear radial direction Rp. Therefore, a movement trajectory for reciprocating motion of the input member 3 when viewed along the axial direction L is a straight line that passes the carrier axis X1. Note that in the following description, a direction along the straight movement trajectory for the reciprocating motion of the input member 3 is defined as an "input direction I".

2. Second Embodiment

A motion conversion device 10 according to a second embodiment is described below with reference to FIG. 2. In this embodiment, a main difference from the first embodiment described above is a configuration of the planetary gear mechanism 1. The description below is focused on differences from the first embodiment described above. Matters not specifically described below are similar to those in the first embodiment described above.

Figure 2:
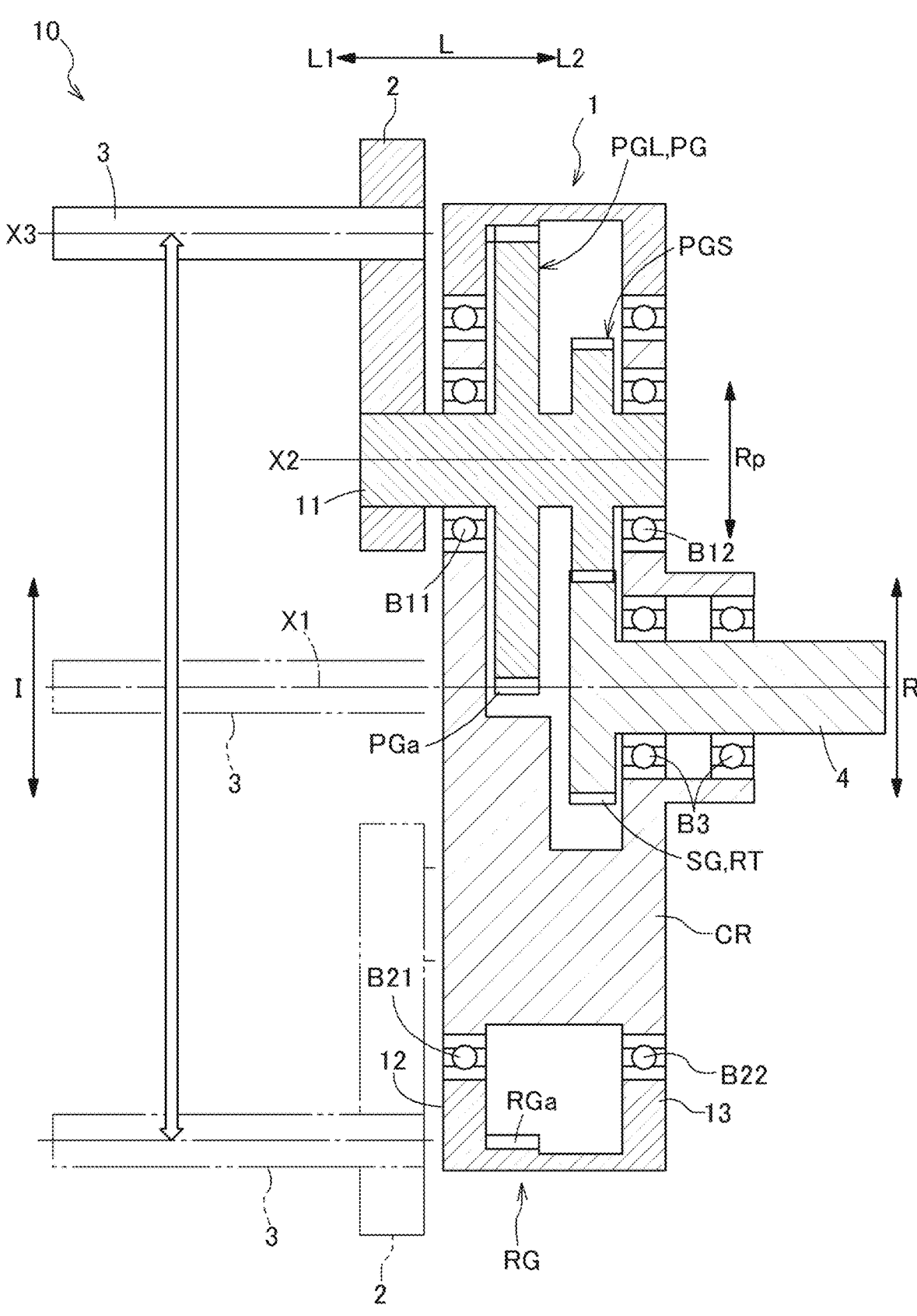
FIG. 2 is a cross-sectional view of a motion conversion device according to a second embodiment.

As illustrated in FIG. 2, in this embodiment, the planetary gear mechanism 1 further includes, in addition to a large-diameter planetary gear PGL serving as the planetary gear PG, a small-diameter planetary gear PGS and a sun gear SG.

The small-diameter planetary gear PGS has a radius smaller than that of the large-diameter planetary gear PGL. The small-diameter planetary gear PGS is coupled to the large-diameter planetary gear PGL in such a way as to rotate in an integrated manner. In this embodiment, the small-diameter planetary gear PGS is disposed on the second side L2 of the axial direction with respect to the large-diameter planetary gear PGL. The small-diameter planetary gear PGS is coupled to the shaft section 11 in such a way as to rotate in an integrated manner.

In this embodiment, a part of the shaft section 11 extending from a tooth section of the large-diameter planetary gear PGL (planetary gear tooth section PGa) to the first side L1 of the axial direction is supported by the first planetary bearing B11 rotatably with respect to the carrier CR. A part of the shaft section 11 extending from a tooth section of the small-diameter planetary gear PGS to the second side L2 of the axial direction is supported by the second planetary bearing B12 rotatably with respect to the carrier CR. In an example illustrated in FIG. 2, as the first planetary bearing B11 and the second planetary bearing B12, ball bearings are used.

The sun gear SG is disposed along the carrier axis X1. The sun gear SG meshes with the small-diameter planetary gear PGS. The sun gear SG is coupled to the output member 4 in such a way as to rotate in an integrated manner. Thus, in this embodiment, the specific rotatable member RT is the sun gear SG.

In this embodiment, the output member 4 is a shaft that is disposed in such a way as to protrude from the sun gear SG to the second side L2 of the axial direction. The output member 4 is supported by a pair of output bearings B3 rotatably with respect to the carrier CR.

In this embodiment, a rotation speed of the carrier CR in the planetary gear mechanism 1 is changed and transmitted to the output member 4. Note that, in this embodiment, by appropriately adjusting a ratio of the radius of the small-diameter planetary gear PGS to a radius of the sun gear SG, the planetary gear mechanism 1 may serve as a reducer or a speed-up device and the transmission gear ratio may be changed.

3. Third Embodiment

Figure 3:
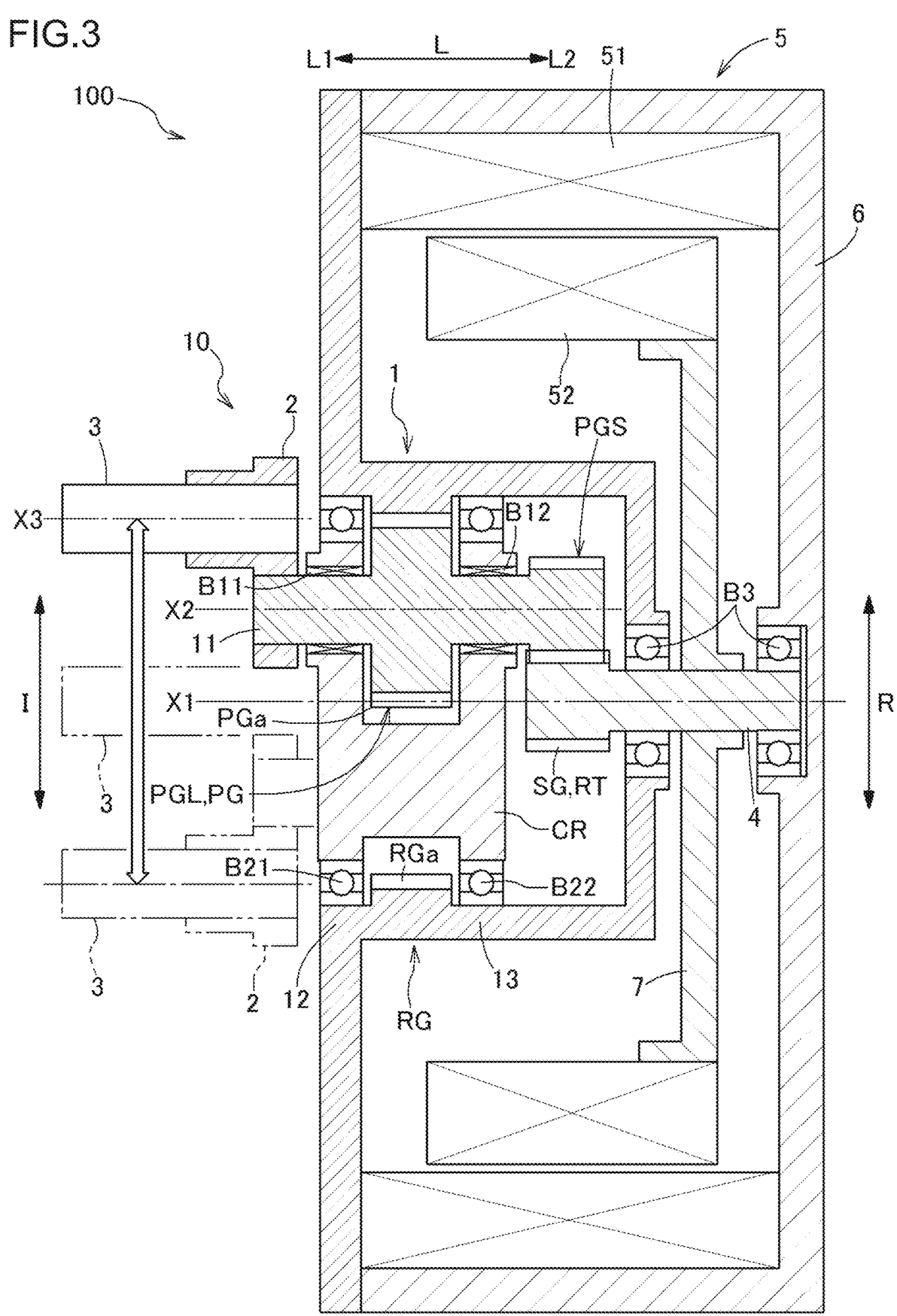
FIG. 3 is a cross-sectional view of a motion conversion device according to a third embodiment and a power generation device including the motion conversion device.

A motion conversion device 10 according to a third embodiment and a power generation device 100 including the motion conversion device 10 are described below with reference to FIG. 3. In the motion conversion device 10 according to this embodiment, a main difference from the second embodiment described above is a structure for supporting the output member 4. The description below is focused on differences from the second embodiment described above. Matters not specifically described below are similar to those in the second embodiment described above.

The power generation device 100 includes a rotating electric machine 5. In this embodiment, the power generation device 100 further includes a case 6.

The rotating electric machine 5 includes a stator 51 and a rotor 52. The stator 51 is fixed to a non-rotatable member. In this embodiment, the stator 51 is fixed to the case 6 serving as the non-rotatable member. The rotor 52 is supported rotatably with respect to the stator 51. In this embodiment, the stator 51 and the rotor 52 are disposed along the carrier axis X1. The rotor 52 is disposed on the inside in the radial direction R with respect to the stator 51.

The rotor 52 is coupled to the output member 4 in such a way as to rotate in an integrated manner. In this embodiment, the rotor 52 is coupled to the output member 4 through a rotor supporting member 7. The rotor supporting member 7 is shaped in such a way as to extend along the radial direction R. In this embodiment, the rotor supporting member 7 is disposed between a pair of output bearings B3 in the axial direction L in such a way as to extend to the outside from the output member 4 in the radial direction R. The rotor supporting member 7 supports the rotor 52 from inside in the radial direction R.

The case 6 accommodates the rotating electric machine 5. In this embodiment, the ring gear RG is fixed to the case 6. In this embodiment, the output member 4 is supported by the pair of output bearings B3 rotatably with respect to the case 6.

In this embodiment, reciprocating motion of the input member 3 is converted by the motion conversion device 10 into rotational motion of the output member 4. Accordingly, the rotor 52 of the rotating electric machine 5 rotates in an integrated manner with the output member 4. As the result, the rotating electric machine 5 generates electricity by means of driving force transmitted to the rotor 52.

In this embodiment, the motion conversion device 10 is disposed on the inside in the radial direction R with respect to the stator 51 and at a position where the motion conversion device 10 overlaps the stator 51 when viewed along the radial direction R. In an example illustrated in FIG. 3, the planetary gear mechanism 1 and the output member 4 of the motion conversion device 10 are disposed in such a way as to overlap the stator 51 when viewed along the radial direction R.

In this embodiment, a part of the shaft section 11 between the large-diameter planetary gear PGL and the small-diameter planetary gear PGS is supported by the second planetary bearing B12 rotatably with respect to the carrier CR. In the example illustrated in FIG. 3, as the first planetary bearing B11 and the second planetary bearing B12, bearings that are relatively thin (that is, a dimension in the planetary gear radial direction Rp is small) are used, such as needle roller bearings or plain bearings.

4. Fourth Embodiment

A motion conversion device 10 according to a fourth embodiment and a power generation device 100 including the motion conversion device 10 are described below with reference to FIG. 4. In the motion conversion device 10 according to this embodiment, main differences from the first embodiment described above are a configuration of the planetary gear mechanism 1, the number of the crank members 2, and the number of the input members 3. The description below is focused on differences from the first embodiment described above. Matters not specifically described below are similar to those in the first embodiment described above.

Figure 4:
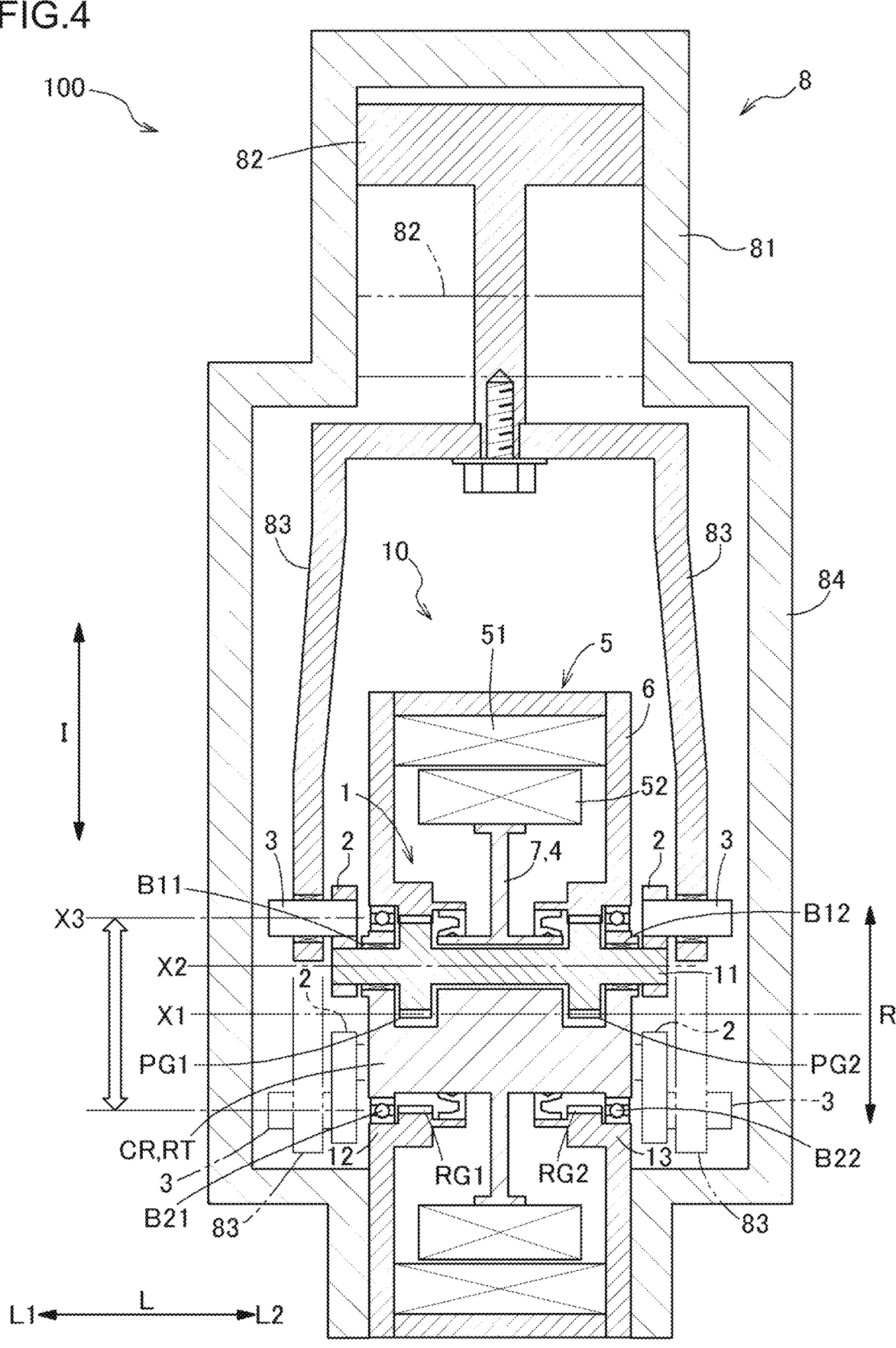
FIG. 4 is a cross-sectional view of a motion conversion device according to a fourth embodiment and a power generation device including the motion conversion device.

As illustrated in FIG. 4, in this embodiment, the ring gear RG includes a first ring gear RG1 and a second ring gear RG2. The first ring gear RG1 and the second ring gear RG2 are disposed at different positions in the axial direction L. In this embodiment, the first ring gear RG1 is disposed on the first side L1 of the axial direction with respect to the second ring gear RG2.

In this embodiment, the planetary gear PG includes a first planetary gear PG1 and a second planetary gear PG2. The first planetary gear PG1 meshes with the first ring gear RG1. The second planetary gear PG2 meshes with the second ring gear RG2. In this embodiment, the first planetary gear PG1 and the second planetary gear PG2 are helical gears having tooth flanks that are shaped in such a way that thrust force along the axial direction L acting on the tooth flanks of each of the planetary gears is in directions opposite to each other.

In this embodiment, the power generation device 100 further includes, in addition to the aforementioned rotating electric machine 5, an internal-combustion engine 8. The internal-combustion engine 8 is an engine that is driven by combustion of fuel and derives power (such as a gasoline engine or a diesel engine). The internal-combustion engine 8 includes a cylinder 81, a piston 82, and a connecting rod 83. In this embodiment, the internal-combustion engine 8 further includes a crankcase 84.

The cylinder 81 is a cylindrically shaped member. In this embodiment, the cylinder 81 is shaped in such a way as to extend along the input direction I.

The piston 82 is configured to reciprocate inside the cylinder 81. In this embodiment, the piston 82 is configured to perform reciprocating motion along the input direction I.

The connecting rod 83 is coupled to the piston 82. The connecting rod 83 is relatively rotatably coupled to the crank member 2 through the input member 3. In this embodiment, the connecting rod 83 is shaped in such a way as to extend along the input direction I.

The crankcase 84 accommodates the connecting rod 83 and the motion conversion device 10. The crankcase 84 is integrally formed with the cylinder 81.

In this embodiment, the internal-combustion engine 8 is disposed on the outside in the radial direction R with respect to the stator 51 and at a position where the internal-combustion engine 8 overlaps the stator 51 when viewed along the radial direction R. In an example illustrated in FIG. 4, the cylinder 81, the piston 82, and a section of the connecting rod 83 for connection with the piston 82 of the internal-combustion engine 8 are disposed in such a way as to overlap the stator 51 when viewed along the radial direction R.

In this embodiment, the motion conversion device 10 includes a pair of crank members 2 and a pair of the input members 3.

The pair of crank members 2 are respectively disposed on one side and the other side of the axial direction L with respect to the planetary gear PG. In this embodiment, one of the crank members 2 is disposed on the first side L1 of the axial direction with respect to the first planetary gear PG1. And the other of the crank members 2 is disposed on the second side L2 of the axial direction with respect to the second planetary gear PG2.

The pair of the input members 3 are individually supported by the pair of crank members 2. In this embodiment, one of the input members 3 is fixed to one of the crank members 2 in such a way as to protrude from the one of the crank members 2 to the first side L1 of the axial direction. And the other of the input members 3 is fixed to the other of the crank members 2 in such a way as to protrude from the other of the crank members 2 to the second side L2 of the axial direction. In this embodiment, the pair of the output members 3 are disposed in such a way as to have the same position in the input direction I.

In this embodiment, the internal-combustion engine 8 includes a pair of the connecting rods 83. The pair of the connecting rods 83 are coupled to the piston 82 in such a way as to move in an integrated manner with the piston 82. The pair of the connecting rods 83 are individually coupled to the pair of crank members 2 through the pair of the input members 3. In other words, one of the connecting rods 83 is relatively rotatably coupled to one of the crank members 2 through one of the input members 3. And the other of the connecting rods 83 is relatively rotatably coupled to the other of the crank members 2 through the other of the input members 3.

In this embodiment, the carrier CR of the planetary gear mechanism 1 is coupled to the rotor 52 of the rotating electric machine 5 through the rotor supporting member 7 in such a way as to rotate in an integrated manner with the rotor 52. In this embodiment, the specific rotatable member RT is the carrier CR. Therefore, in this embodiment, the rotor supporting member 7 coupled to the carrier CR serves as the output member 4.

In this embodiment, the first planetary bearing B11 is disposed on the first side L1 of the axial direction with respect to a tooth section of the first planetary gear PG1 and the second planetary bearing B12 is disposed on the second side L2 of the axial direction with respect to a tooth section of the second planetary gear PG2. In addition, the first carrier bearing B21 is disposed on the first side L1 of the axial direction with respect to a tooth section of the first ring gear RG1 and the second carrier bearing B22 is disposed on the second side L2 of the axial direction with respect to a tooth section of the second ring gear RG2. The rotor supporting member 7 is disposed between the tooth section of the first ring gear RG1 and the tooth section of the second ring gear RG2 in the axial direction L.

In this embodiment, as the piston 82 of the internal-combustion engine 8 reciprocates, driving force along the input direction I is transmitted through the pair of the connecting rods 83 to the pair of the input members 3. And reciprocating motion of the pair of the input members 3 along the input direction I is converted by the planetary gear mechanism 1 into rotational motion of the output member 4. As the result, the rotating electric machine 5 generates electricity by means of the driving force transmitted to the rotor 52 through the rotor supporting member 7 serving as the output member 4.

5. Fifth Embodiment

A motion conversion device 10 according to a fifth embodiment and a power generation device 100 including the motion conversion device 10 are described below with reference to FIG. 5. In the motion conversion device 10 according to this embodiment, a main difference from the fourth embodiment described above is the configuration of the planetary gear mechanism 1. The description below is focused on differences from the fourth embodiment described above. Matters not specifically described below are similar to those in the fourth embodiment described above.

Figure 5:
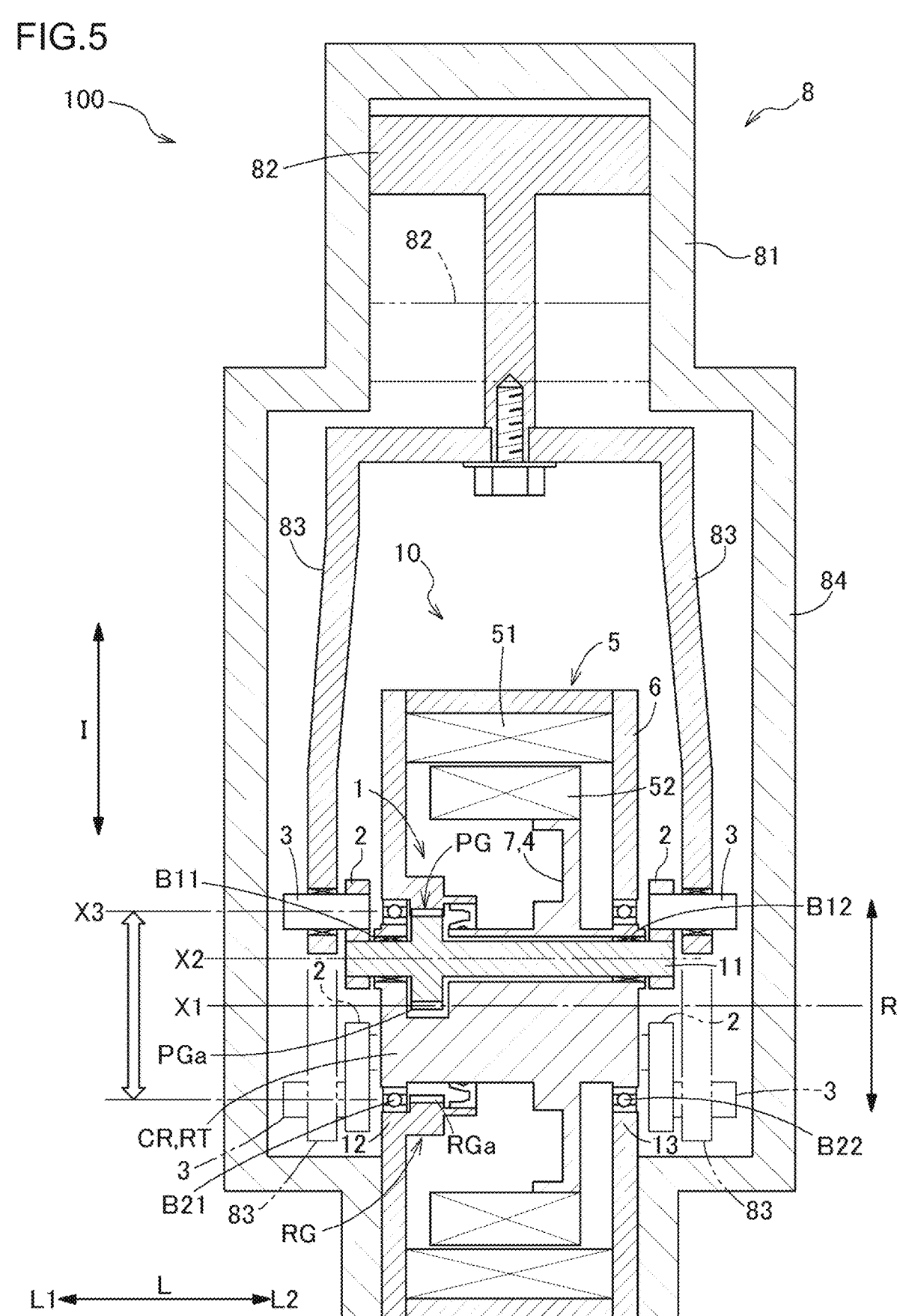
FIG. 5 is a cross-sectional view of a motion conversion device according to a fifth embodiment and a power generation device including the motion conversion device.

As illustrated in FIG. 5, in this embodiment, the planetary gear mechanism 1 does not include a plurality of planetary gears and a plurality of ring gears, but includes a single planetary gear PG and a single ring gear RG.

In this embodiment, a first planetary bearing B11 is disposed on the first side L1 of the axial direction with respect to the tooth section of the planetary gear PG (planetary gear tooth section PGa) and a second planetary bearing B12 is disposed on the second side L2 of the axial direction with respect to the tooth section of the planetary gear PG (planetary gear tooth section PGa). In addition, the first carrier bearing B21 is disposed on the first side L1 of the axial direction with respect to the tooth section of the ring gear RG and the second carrier bearing B22 is disposed on the second side L2 of the axial direction with respect to the tooth section of the ring gear RG. The rotor supporting member 7 is disposed between the tooth section of the ring gear RG and the second carrier bearing B22 in the axial direction L.

6. Alternative Embodiment (1) In the embodiment described above, the configuration in which the radius r2 of the planetary gear PG is equal in size to the distance d between the planetary gear axis X2 and the input axis X3 in the planetary gear radial direction Rp is described by way of example. However, configurations for embodiments are not limited to such a configuration, and embodiments may have a configuration in which the radius r2 of the planetary gear PG is different from the distance d between the planetary gear axis X2 and the input axis X3 in the planetary gear radial direction Rp. In this configuration, a movement trajectory for reciprocating motion of the input member 3 when viewed along the axial direction L is an elliptical line around the carrier axis X1.

(2) In the embodiment described above, the configuration in which the input member 3 is a shaft fixed to the crank member 2 is described by way of example. However, configurations for embodiments are not limited to such a configuration, and embodiments may have a configuration, for example, in which a shaft serving as the input member 3 is not provided and a part of the crank member 2 serves as the input member 3.

(3) In the embodiment 4 and the embodiment 5 described above, the configuration in which the power generation device 100 includes the internal-combustion engine 8 is described by way of example. However, configurations for embodiments are not limited to such a configuration, and embodiments may have, for example, a configuration in which the power generation device 100 includes a piston-type pump instead of the internal-combustion engine 8.

(4) The configurations disclosed in the embodiments described above may be combined with the configuration disclosed in other embodiments and applied to other embodiments as long as there is no inconsistency. Including other configurations, embodiments disclosed in this description are merely examples in every respect. Various modifications may be appropriately made without departing from the spirit and the scope of this disclosure.

A technique according to this disclosure can be used in a motion conversion device that converts reciprocating motion into rotational motion and a power generation device including the motion conversion device.

7. Summary of Embodiments

A summary of the motion conversion device (10) and the power generation device (100) that have been described above is described below.

A motion conversion device (10) includes:

a planetary gear mechanism (1) including a ring gear (RG) being a stationary internal gear, a planetary gear (PG) that meshes with the ring gear (RG), and a carrier (CR) that rotatably supports the planetary gear (PG);

a crank member (2) that is disposed in such a way as to extend in a planetary gear radial direction (Rp) orthogonal to a planetary gear axis (X2) serving as a rotation axis of the planetary gear (PG) and coupled to the planetary gear (PG) in such a way as to rotate in an integrated manner;

an input member (3) that is supported by the crank member (2) and disposed on an input axis (X3) spaced apart from the planetary gear axis (X2) in the planetary gear radial direction (Rp); and an output member (4) being coupled to a specific rotatable member (RT) that rotates in conjunction with the carrier (CR), the specific rotatable member being a member other than the planetary gear (PG), wherein a radius (r1) of the ring gear (RG) is twice as large as a radius (r2) of the planetary gear (PG), assuming that a direction along a carrier axis (X1) serving as a rotation axis of the carrier (CR) is an axial direction (L) and a direction orthogonal to the carrier axis (X1) is a radial direction (R), a first planetary bearing (B11) and a second planetary bearing (B12) that support the planetary gear (PG) rotatably with respect to the carrier (CR) are respectively disposed on one side and another side of the axial direction (L) with respect to a tooth section (PGa) of the planetary gear (PG), a first carrier bearing (B21) and a second carrier bearing (B22) that support the carrier (CR) rotatably with respect to the ring gear (RG) are respectively disposed on one side and another side of the axial direction (L) with respect to a tooth section (RGa) of the ring gear (RG), the first carrier bearing (B21) is disposed in such a way as to overlap, when viewed along the radial direction (R), a movement trajectory of the first planetary bearing (B11) being generated when the planetary gear (PG) revolves, and the second carrier bearing (B22) is disposed in such a way as to overlap, when viewed along the radial direction, a movement trajectory of the second planetary bearing (B12) being generated when the planetary gear (PG) revolves.

With this configuration, the first planetary bearing (B11) and the second planetary bearing (B12), being disposed on one side and another side of the axial direction (L) with respect to the tooth section (PGa) of the planetary gear (PG), support the planetary gear (PG) rotatably with respect to the carrier (CR). In addition, the first carrier bearing (B21) and the second carrier bearing (B22), being disposed on one side and another side of the axial direction (L) with respect to the tooth section (RGa) of the ring gear (RG), support the carrier (CR) rotatably with respect to the ring gear (RG). Accordingly, support stiffness of the planetary gear (PG) may be easily ensured. Therefore, even when a load acts on the planetary gear (PG) unevenly in the axial direction (L), the load can be properly supported.

In this configuration, the first carrier bearing (B21) is disposed in such a way as to overlap, when viewed along the radial direction, the movement trajectory of the first planetary bearing (B11) being generated when the planetary gear (PG) revolves, and the second carrier bearing (B22) is also disposed in such a way as to overlap, when viewed along the radial direction, the movement trajectory of the second planetary bearing (B12) being generated when the planetary gear (PG) revolves. Thus, a dimension in the axial direction (L) of the motion conversion device (10) can be easily reduced.

The ring gear (RG) may be provided with a first supporting section (12) and a second supporting section (13) that respectively extend to one side and another side of the axial direction (L) with respect to the tooth section (RGa) of the ring gear (RG), the first supporting section (12) may support the first carrier bearing (B21) from outside in the radial direction (R) and be disposed in such a way as to overlap, when viewed along the radial direction, the movement trajectory of the first planetary bearing (B11) being generated when the planetary gear (PG) revolves, and the second supporting section (13) may support the second carrier bearing (B22) from outside in the radial direction (R) and be disposed in such a way as to overlap, when viewed along the radial direction, the movement trajectory of the second planetary bearing (B12) being generated when the planetary gear (PG) revolves.

With this configuration, the carrier (CR) can be properly supported by the first supporting section (12) and the second supporting section (13), being respectively extend to one side and another side of the axial direction (L) with respect to the tooth section (RGa) of the ring gear (RG) through the first carrier bearing (B21) and the second carrier bearing (B22) with respect to the ring gear (RG). In addition, the planetary gear (PG) can be properly supported through the first planetary bearing (B11) and the second planetary bearing (B12) with respect to the carrier (CR). Accordingly, high support stiffness of the planetary gear (PG) can be ensured.

The radius (r2) of the planetary gear (PG) may be equal in size to a distance (d) between the planetary gear axis (X2) and the input axis (X3) in the planetary gear radial direction (Rp).

With this configuration, a movement trajectory for reciprocating motion of the input member (3) can be linearized. Thus, movement of the motion conversion device (10) can be easily simplified.

The planetary gear mechanism (1) may further include:

a small-diameter planetary gear (PGS) that has a radius smaller than that of a large-diameter planetary gear (PGL) serving as the planetary gear (PG) and rotates in an integrated manner with the large-diameter planetary gear (PGL); and a sun gear (SG) that is disposed on the carrier axis (X1) and meshes with the small-diameter planetary gear (PGS), and the output member (4) may be coupled to the sun gear (SG) in such a way as to rotate in an integrated manner.

With this configuration, a rotation speed of the carrier (CR) can be changed and transmitted to the output member (4). Such a change in the rotation speed can be achieved with a simple configuration.

The ring gear (RG) may include a first ring gear (RG1) and a second ring gear (RG2) that are disposed at different positions in the axial direction (L), the planetary gear (PG) may include a first planetary gear (PG1) that meshes with the first ring gear (RG1) and a second planetary gear (PG2) that meshes with the second ring gear (RG2), and the first planetary gear (PG1) and the second planetary gear (PG2) may be helical gears having tooth flanks being shaped in such a way that thrust force along the axial direction (L) acting on the tooth flanks of each of the planetary gears is in directions opposite to each other.

With this configuration, compared with a configuration in which the first planetary gear (PG1) and the second planetary gear (PG2) are spur gears, strength of the tooth flanks of the first planetary gear (PG1) and the second planetary gear (PG2) can be improved, and sound generated due to meshing between the first planetary gear (PG1) and the first ring gear (RG1) and meshing between the second planetary gear (PG2) and the second ring gear (RG2) can be reduced.

In addition, with this configuration, a structure for supporting thrust force acting on the first planetary gear (PG1) and the second planetary gear (PG2) can be easily simplified.

A power generation device (100) includes:

the aforementioned motion conversion device (10);

an internal-combustion engine (8) including a cylinder (81), a piston (82) that reciprocates inside the cylinder (81), and a connecting rod (83) coupled to the piston (82); and a rotating electric machine (5) including a stator (51) and a rotor (52), wherein the crank member (2) is relatively rotatably coupled to the connecting rod (83) through the input member (3), the output member (4) is coupled to the rotor (52) in such a way as to rotate in an integrated manner, and the motion conversion device (10) is disposed on an inside in the radial direction (R) with respect to the stator (51) and at a position where the motion conversion device (10) overlaps the stator (51) when viewed along the radial direction.

This configuration enables the rotating electric machine (5) to serve as a power generator and the power generation device (100) that generates electricity by means of driving force generated by the internal-combustion engine (8) to be miniaturized.

The motion conversion device (10) may include a pair of the crank members (2) that are respectively disposed on one side and another side of the axial direction (L) with respect to the planetary gear (PG) and a pair of the input members (3) individually supported by a pair of the crank members (2), and the internal-combustion engine (8) may include a pair of the connecting rods (83) individually coupled to a pair of the crank members (2) through a pair of the input members (3).

With this configuration, a load is input from the connecting rod (83) through the input member (3) to a pair of the crank members (2) that are respectively disposed on one side and another side of the axial direction (L) with respect to the planetary gear (PG). Thus, a load that unevenly acts on the planetary gear (PG) coupled to a pair of the crank members (2) can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion conversion device comprising:

a planetary gear mechanism including a ring gear being a stationary internal gear, a planetary gear that meshes with the ring gear, and a carrier that rotatably supports the planetary gear;

a crank member that is disposed in such a way as to extend in a planetary gear radial direction orthogonal to a planetary gear axis serving as a rotation axis of the planetary gear and coupled to the planetary gear in such a way as to rotate in an integrated manner;

an input member that is supported by the crank member and disposed on an input axis spaced apart from the planetary gear axis in the planetary gear radial direction; and an output member that is coupled to a specific rotatable member that rotates in conjunction with the carrier, the specific rotatable member being a member other than the planetary gear, wherein a radius of the ring gear is twice as large as that of the planetary gear, a direction along a carrier axis serving as a rotation axis of the carrier is an axial direction and a direction orthogonal to the carrier axis is a radial direction, a first planetary bearing and a second planetary bearing that support the planetary gear rotatably with respect to the carrier are respectively disposed on one side and another side of the axial direction with respect to a tooth section of the planetary gear, a first carrier bearing and a second carrier bearing that support the carrier rotatably with respect to the ring gear are respectively disposed on one side and another side of the axial direction with respect to a tooth section of the ring gear, the first carrier bearing is disposed in such a way as to overlap, when viewed along the radial direction, a movement trajectory of the first planetary bearing being generated when the planetary gear revolves, and the second carrier bearing is disposed in such a way as to overlap, when viewed along the radial direction, a movement trajectory of the second planetary bearing being generated when the planetary gear revolves, wherein the planetary gear mechanism further includes:

a small-diameter planetary gear that has a radius smaller than that of a large-diameter planetary gear serving as the planetary gear and rotates in an integrated manner with the large-diameter planetary gear; and a sun gear that is disposed on the carrier axis and meshes with the small-diameter planetary gear, wherein the output member is coupled to the sun gear in such a way as to rotate in an integrated manner.

2. A motion conversion device comprising:

a planetary gear mechanism including a ring gear being a stationary internal gear, a planetary gear that meshes with the ring gear, and a carrier that rotatably supports the planetary gear;

a crank member that is disposed in such a way as to extend in a planetary gear radial direction orthogonal to a planetary gear axis serving as a rotation axis of the planetary gear and coupled to the planetary gear in such a way as to rotate in an integrated manner;

an input member that is supported by the crank member and disposed on an input axis spaced apart from the planetary gear axis in the planetary gear radial direction; and an output member that is coupled to a specific rotatable member that rotates in conjunction with the carrier, the specific rotatable member being a member other than the planetary gear, wherein a radius of the ring gear is twice as large as that of the planetary gear, a direction along a carrier axis serving as a rotation axis of the carrier is an axial direction and a direction orthogonal to the carrier axis is a radial direction, a first planetary bearing and a second planetary bearing that support the planetary gear rotatably with respect to the carrier are respectively disposed on one side and another side of the axial direction with respect to a tooth section of the planetary gear, a first carrier bearing and a second carrier bearing that support the carrier rotatably with respect to the ring gear are respectively disposed on one side and another side of the axial direction with respect to a tooth section of the ring gear, the first carrier bearing is disposed in such a way as to overlap, when viewed along the radial direction, a movement trajectory of the first planetary bearing being generated when the planetary gear revolves, and the second carrier bearing is disposed in such a way as to overlap, when viewed along the radial direction, a movement trajectory of the second planetary bearing being generated when the planetary gear revolves, wherein the ring gear includes a first supporting section and a second supporting section that respectively extend to one side and another side of the axial direction with respect to the tooth section of the ring gear, the first supporting section supports the first carrier bearing from outside in the radial direction and is disposed in such a way as to overlap, when viewed along the radial direction, the movement trajectory of the first planetary bearing being generated when the planetary gear revolves, and the second supporting section supports the second carrier bearing from outside in the radial direction and is disposed in such a way as to overlap, when viewed along the radial direction, the movement trajectory of the second planetary bearing being generated when the planetary gear revolves.

3. The motion conversion device according to claim 1, wherein a radius of the planetary gear is equal in size to a distance between the planetary gear axis and the input axis in the planetary gear radial direction.

4. A motion conversion device comprising:

a planetary gear mechanism including a ring gear being a stationary internal gear, a planetary gear that meshes with the ring gear, and a carrier that rotatably supports the planetary gear;

a crank member that is disposed in such a way as to extend in a planetary gear radial direction orthogonal to a planetary gear axis serving as a rotation axis of the planetary gear and coupled to the planetary gear in such a way as to rotate in an integrated manner;

an input member that is supported by the crank member and disposed on an input axis spaced apart from the planetary gear axis in the planetary gear radial direction; and an output member that is coupled to a specific rotatable member that rotates in conjunction with the carrier, the specific rotatable member being a member other than the planetary gear, wherein a radius of the ring gear is twice as large as that of the planetary gear, a direction along a carrier axis serving as a rotation axis of the carrier is an axial direction and a direction orthogonal to the carrier axis is a radial direction, a first planetary bearing and a second planetary bearing that support the planetary gear rotatably with respect to the carrier are respectively disposed on one side and another side of the axial direction with respect to a tooth section of the planetary gear, a first carrier bearing and a second carrier bearing that support the carrier rotatably with respect to the ring gear are respectively disposed on one side and another side of the axial direction with respect to a tooth section of the ring gear, the first carrier bearing is disposed in such a way as to overlap, when viewed along the radial direction, a movement trajectory of the first planetary bearing being generated when the planetary gear revolves, and the second carrier bearing is disposed in such a way as to overlap, when viewed along the radial direction, a movement trajectory of the second planetary bearing being generated when the planetary gear revolves, wherein the ring gear includes a first ring gear and a second ring gear that are disposed at different positions in the axial direction, the planetary gear includes a first planetary gear that meshes with the first ring gear and a second planetary gear that meshes with the second ring gear, and the first planetary gear and the second planetary gear are helical gears having tooth flanks being shaped in such a way that thrust force along the axial direction acting on the tooth flanks of each of the planetary gears is in directions opposite to each other.

5. A power generation device comprising:

a motion conversion device comprising:

a planetary gear mechanism including a ring gear being a stationary internal gear, a planetary gear that meshes with the ring gear, and a carrier that rotatably supports the planetary gear;

a crank member that is disposed in such a way as to extend in a planetary gear radial direction orthogonal to a planetary gear axis serving as a rotation axis of the planetary gear and coupled to the planetary gear in such a way as to rotate in an integrated manner;

an input member that is supported by the crank member and disposed on an input axis spaced apart from the planetary gear axis in the planetary gear radial direction; and an output member that is coupled to a specific rotatable member that rotates in conjunction with the carrier, the specific rotatable member being a member other than the planetary gear, wherein a radius of the ring gear is twice as large as that of the planetary gear, a direction along a carrier axis serving as a rotation axis of the carrier is an axial direction and a direction orthogonal to the carrier axis is a radial direction, a first planetary bearing and a second planetary bearing that support the planetary gear rotatably with respect to the carrier are respectively disposed on one side and another side of the axial direction with respect to a tooth section of the planetary gear, a first carrier bearing and a second carrier bearing that support the carrier rotatably with respect to the ring gear are respectively disposed on one side and another side of the axial direction with respect to a tooth section of the ring gear, the first carrier bearing is disposed in such a way as to overlap, when viewed along the radial direction, a movement trajectory of the first planetary bearing being generated when the planetary gear revolves, and the second carrier bearing is disposed in such a way as to overlap, when viewed along the radial direction, a movement trajectory of the second planetary bearing being generated when the planetary gear revolves; and an internal-combustion engine including a cylinder, a piston that reciprocates inside the cylinder, and a connecting rod coupled to the piston; and a rotating electric machine including a stator and a rotor, wherein the crank member is relatively rotatably coupled to the connecting rod through the input member, the output member is coupled to the rotor in such a way as to rotate in an integrated manner, and the motion conversion device is disposed on an inside in the radial direction with respect to the stator and at a position where the motion conversion device overlaps the stator when viewed along the radial direction.

6. The power generation device according to claim 5, wherein the motion conversion device includes a pair of the crank members respectively disposed on one side and another side of the axial direction with respect to the planetary gear and a pair of the input members individually supported by a pair of the crank members, and the internal-combustion engine includes a pair of the connecting rods individually coupled to a pair of the crank members through a pair of the input members.

7. The motion conversion device according to claim 2, wherein a radius of the planetary gear is equal in size to a distance between the planetary gear axis and the input axis in the planetary gear radial direction.

8. The motion conversion device according to claim 2, wherein the planetary gear mechanism further includes:

a small-diameter planetary gear that has a radius smaller than that of a large-diameter planetary gear serving as the planetary gear and rotates in an integrated manner with the large-diameter planetary gear; and a sun gear that is disposed on the carrier axis and meshes with the small-diameter planetary gear, and the output member is coupled to the sun gear in such a way as to rotate in an integrated manner.

9. The motion conversion device according to claim 2, wherein the ring gear includes a first ring gear and a second ring gear that are disposed at positions different from each other in the axial direction, the planetary gear includes a first planetary gear that meshes with the first ring gear and a second planetary gear that meshes with the second ring gear, and the first planetary gear and the second planetary gear are helical gears having tooth flanks being shaped in such a way that thrust force along the axial direction acting on the tooth flanks of each of the planetary gears is in directions opposite to each other.

10. A power generation device, comprising:

the motion conversion device according to claim 2;

an internal-combustion engine including a cylinder, a piston that reciprocates inside the cylinder, and a connecting rod coupled to the piston; and a rotating electric machine including a stator and a rotor, wherein the crank member is relatively rotatably coupled to the connecting rod through the input member, the output member is coupled to the rotor in such a way as to rotate in an integrated manner, and the motion conversion device is disposed on an inside in the radial direction with respect to the stator and at a position where the motion conversion device overlaps the stator when viewed along the radial direction.

11. The power generation device according to claim 10, wherein the motion conversion device includes a pair of the crank members respectively disposed on one side and another side of the axial direction with respect to the planetary gear and a pair of the input members individually supported by a pair of the crank members, and the internal-combustion engine includes a pair of the connecting rods individually coupled to a pair of the crank members through a pair of the input members.

\*    \*    \*    \*    \*